United States Patent Office 3,557,205
Patented Jan. 19, 1971

3,557,205
STABILIZATION OF POLYACID HALIDES
John E. Santo, West New York, and Jan E. Vandegaer, Wayne, N.J., assignors to Pennwalt Corporation, a corporation of Pennsylvania
No Drawing. Filed Aug. 23, 1967, Ser. No. 662,566
Int. Cl. C07c 51/50, 51/58
U.S. Cl. 260—544                                       9 Claims

ABSTRACT OF THE DISCLOSURE

A stabilized organic polyacid halide solution containing a formamide and thionyl halide or sulfuryl halide. Example: Sebacyl chloride containing 1% thionyl chloride and 0.5% N,N-dimethylformamide.

BACKGROUND OF THE INVENTION

This invention relates to organic polyacid halides, and particularly organic diacid halides, which have been stabilized against deterioration in storage.

The slow decomposition of diacid chlorides, evidenced by heavy precipitation, presents difficulties for the large scale production of these compounds. This slow decomposition makes it necessary to distill the crude product in special equipment. The considerable losses during distillation and the price of the special equipment raises the manufacturing price of the final product to a relatively high level.

The mechanism of the decomposition and the complete structure of the precipitate remain to be elucidated. However, our investigation of the precipitate indicates the presence of polyanhydride groups which could be derived from the hydrolysis of some of the acid halide groups. Since the diacid chlorides find their use in most cases as monomers in polymerization reactions, the presence of these partial hydrolysis products is deleterious to the resulting polymer.

OBJECTS

The principal object of the invention is a composition of polyacid halide, particularly diacid halide, which decomposes (deteriorates) at a slow rate or even not at all at ordinary storage conditions.

Other objects will be evident from the detailed description of the invention.

SUMMARY OF THE INVENTION

The stabilized composition of the invention consists essentially of an organic polyacid halide, a small but stabilizing amount of a formamide and thionyl halide or sulfuryl halide.

DESCRIPTION OF THE INVENTION AND EXAMPLES

It has been discovered that organic polyacid halides, broadly, and particularly the organic diacid halides can be stabilized against the usual rapid decomposition (deterioration) by the presence of a small amount of thionyl halide or sulfuryl halide and a formamide.

Although the discovery is applicable to all the halides, i.e., fluoride, chloride, bromide or iodide, it is of especial interest to the commercially important chlorides. Illustrative diacid chlorides are: oxalyl, malonyl, succinyl, glutaryl, adipyl, pimelyl, suberyl, azelayl, sebacyl, and fumaryl. The aliphatic hydrocarbon diacid halides having 6–12 carbon atoms which do not tend to form internal anhydrides are of especial interest.

The composition of the invention includes a small but stabilizing amount of thionyl halide, preferably thionyl chloride, and/or sulfuryl halide, preferably sulfuryl chloride. The amount of thionyl and/or sulfuryl halide present will be determined by the length of time, and temperature conditions, of storage of the composition. In general the amount will be 5%, based on polyacid halide, or less. More usually 2% or less will be present.

The composition of the invention also includes a formamide (N-formyl amine) in an amount, normally less than the amount of thionyl (sulfuryl) halide present Usually the formamide will be present in amount of 1% or less.

The formamide may be written RR'-N-CHO where R and R' may be hydrogen or the same or different radicals such as aliphatic, cycloaliphatic, heterocyclic or aromatic, preferably alkyl, cycloalkyl, phenyl, or R and R' may form part of a heterocyclic ring including N, which ring may contain atoms other than carbon, such as O and S. Preferably only the formyl and amino groups are present. Illustrative formamides are: formamide; N,N-dimethyl formamide; N,N-diethyl formamide; N-formyldiphenylamine; N-formyl hexamethyleneimine; N-formyl morpholine; N-formyl piperidine.

The N,N-dialkyl formamides, specifically N,N-dimethyl formamide, are preferred; particularly where alkyl has 1–4 carbon atoms.

Example I

Crude, undistilled sebacyl chloride (40.0 g.) plus 0.4 g. of either $SOCl_2$ or $PCl_3$ in two samples; plus 0.4 g. of $SOCl_2$ plus 1 drop of N,N-dimethylformamide (DMF) in one sample; and sebacylchloride alone in one sample was stored in stoppered bottles at room temperature (about 75° F.) for three (3) months. The extent of deterioration was observed visually, as follows.

Sebacyl chloride:                              Precipitate
   (1) Alone _____ Very heavy.
   (2) Plus $PCl_3$ _____ Very heavy.
   (3) Plus $SOCl_2$ _____ Some.
   (4) Plus $SOCl_2$ and DMF _____ None.

Example II

The test of Example I was carried out replacing the sebacyl chloride with adipyl chloride. The results were:
Adipyl chloride:                               Precipitate
   (1) Alone _____ Very heavy.
   (2) Plus $PCl_3$ _____ Very heavy.
   (3) Plus $SOCl_2$ _____ Some.
   (4) Plus $SOCl_2$ and DMF _____ None.

Example III

Samples of sebacyl chloride containing 1% of $SOCl_2$ and 0.5% of a N-formylamine were stored at room temperature for 60 days. The visual observations were:

Amide:                                         Very cloudy; no ppt.
   (1) N-formyl hexamethyleneimine     Very cloudy; No ppt.
   (2) N-formyl morpholine _____ Cloudy; no ppt.
   (3) N-formyl piperidine _____ Cloudy; no ppt.
   (4) DMF _____ Clear; no ppt.
   (5) Control (No $SOCl_2$ or amide) Heavy ppt.
Note: ppt=precipitate.

Thus having described the invention, what is claimed is:

1. A stabilized organic diacid halide consisting essentially of an aliphatic hydrocarbon diacid chloride free of acetylenic unsaturation and having from 2 to 12 carbon atoms and from about 0.5% to about 1% of a formamide selected from the group consisting of N,N-dialkyl formamides wherein the alkyl groups have 1 to 4 carbon atoms, N-formyl diphenylamine, N-formyl hexamethyleneimine, N-formyl morpholine, and N- formyl piperidine and from about 1% to about 5% of a member selected from the class consisting of thionyl halide and sulfuryl halide, the amounts of said additives based on the weight of the diacid chloride.

2. The composition of claim 1 wherein said diacid halide is an aliphatic hydrocarbon diacid halide having 6–12 carbon atoms, which does not tend to form internal anhydride.

3. The composition of claim 2 wherein said diacid halide is adipyl chloride.

4. The composition of claim 2 wherein said diacid halide is sebacyl chloride.

5. The composition of claim 1 wherein said formamide is an N,N-dialkyl formamide.

6. The composition of claim 5 wherein said formamide is N,N-dimethyl formamide.

7. The composition of claim 1 wherein said member is thionyl chloride.

8. A stabilized composition consisting of adipyl chloride, about 100 parts by weight; thionyl chloride, about one part by weight, and N,N-dimethylformamide, about one part by weight.

9. A stabilized composition consisting of sebacyl chloride, about 100 parts by weight; thionyl chloride, about 1 part by weight; and N-formyl piperidine, about 0.5 part by weight.

References Cited

FOREIGN PATENTS 942,621   11/1963   Great Britain _____ 260—544

OTHER REFERENCES

Wagner, Synthetic Organic Chemistry, p. 548.

LORRAINE A. WEINBERGER, Primary Examiner

E. J. GLEIMAN, Assistant Examiner